(12) United States Patent
Bhat et al.

(10) Patent No.: US 10,460,732 B2
(45) Date of Patent: Oct. 29, 2019

(54) SYSTEM AND METHOD TO INSERT VISUAL SUBTITLES IN VIDEOS

(71) Applicant: Tata Consultancy Services Limited, Mumbai (IN)

(72) Inventors: Chitralekha Bhat, Thane (IN); Sunil Kumar Kopparapu, Thane (IN); Ashish Panda, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 195 days.

(21) Appl. No.: 15/473,029

(22) Filed: Mar. 29, 2017

(65) Prior Publication Data

US 2017/0287481 A1  Oct. 5, 2017

(30) Foreign Application Priority Data

Mar. 31, 2016  (IN) .............................. 201621011523

(51) Int. Cl.

| | |
|---|---|
| G10L 15/26 | (2006.01) |
| G10L 21/10 | (2013.01) |
| G10L 21/06 | (2013.01) |
| G10L 15/04 | (2013.01) |
| G10L 15/183 | (2013.01) |
| G10L 15/25 | (2013.01) |

(Continued)

(52) U.S. Cl.
CPC ............ *G10L 15/265* (2013.01); *G10L 15/04* (2013.01); *G10L 15/183* (2013.01); *G10L 15/25* (2013.01); *G10L 15/26* (2013.01); *G10L 21/06* (2013.01); *G10L 21/10* (2013.01); *G10L 25/57* (2013.01); *G10L 25/63* (2013.01); *G10L 25/81* (2013.01); *G11B 27/036* (2013.01); *G10L 2015/025* (2013.01); *G10L 2021/065* (2013.01); *G10L 2021/105* (2013.01)

(58) Field of Classification Search
CPC ......... G10L 2021/105; G10L 2021/065; G10L 21/06; G10L 21/10
See application file for complete search history.

(56) References Cited

U.S. PATENT DOCUMENTS

5,608,839 A * 3/1997 Chen .................. H04N 21/4341
375/E7.083
5,878,396 A    3/1999 Henton
(Continued)

*Primary Examiner* — Samuel G Neway
(74) *Attorney, Agent, or Firm* — Finnegan, Henderson, Farabow, Garrett & Dunner LLP (57) ABSTRACT

A system and method to insert visual subtitles in videos is described. The method comprises segmenting an input video signal to extract the speech segments and music segments. Next, a speaker representation is associated for each speech segment corresponding to a speaker visible in the frame. Further, speech segments are analyzed to compute the phones and the duration of each phone. The phones are mapped to a corresponding viseme and a viseme based language model is created with a corresponding score. Most relevant viseme is selected for the speech segments by computing a total viseme score. Further, a speaker representation sequence is created such that phones and emotions in the speech segments are represented as reconstructed lip movements and eyebrow movements. The speaker representation sequence is then integrated with the music segments and super imposed on the input video signal to create subtitles.

15 Claims, 3 Drawing Sheets

(51) Int. Cl.
  *G10L 25/57* (2013.01)
  *G10L 25/63* (2013.01)
  *G11B 27/036* (2006.01)
  *G10L 25/81* (2013.01)
  *G10L 15/02* (2006.01)

(56) References Cited

U.S. PATENT DOCUMENTS

| | | | | |
|---|---|---|---|---|
| 5,880,788 A * | 3/1999 | Bregler | ............... | G03B 31/02 |
| | | | | 345/473 |
| 6,028,960 A | 2/2000 | Graf et al. | | |
| 6,212,502 B1 | 4/2001 | Ball et al. | | |
| 6,366,885 B1 * | 4/2002 | Basu | ............... | G11B 27/031 |
| | | | | 704/235 |
| 6,539,354 B1 | 3/2003 | Sutton et al. | | |
| 6,542,869 B1 * | 4/2003 | Foote | ............... | G10H 1/00 |
| | | | | 704/500 |
| 6,839,672 B1 * | 1/2005 | Beutnagel | ............... | G10L 21/06 |
| | | | | 704/260 |
| 2003/0018475 A1 * | 1/2003 | Basu | ............... | G06K 9/00228 |
| | | | | 704/270 |
| 2004/0068408 A1 * | 4/2004 | Qian | ............... | G10L 21/06 |
| | | | | 704/270 |
| 2004/0107106 A1 * | 6/2004 | Margaliot | ............... | G06T 13/00 |
| | | | | 704/270 |
| 2006/0290699 A1 * | 12/2006 | Dimtrva | ............... | G06K 9/00268 |
| | | | | 345/473 |
| 2007/0156625 A1 * | 7/2007 | Visel | ............... | G06K 9/00335 |
| | | | | 706/62 |
| 2007/0192089 A1 * | 8/2007 | Fukuda | ............... | G10L 21/04 |
| | | | | 704/210 |
| 2017/0040017 A1 * | 2/2017 | Matthews | ............... | G10L 25/57 |
| 2017/0154457 A1 * | 6/2017 | Theobald | ............... | G06T 13/205 |
| 2017/0287481 A1 * | 10/2017 | Bhat | ............... | G10L 15/04 |
| 2017/0337913 A1 * | 11/2017 | Guegan | ............... | G10H 1/361 |

* cited by examiner

SYSTEM AND METHOD TO INSERT VISUAL SUBTITLES IN VIDEOS

PRIORITY CLAIM

This U.S. patent application claims priority under 35 U.S.C. § 119 to: India Application No. 201621011523, filed on Mar. 31, 2016. The entire contents of the aforementioned application are incorporated herein by reference.

TECHNICAL FIELD

This disclosure relates generally to the field of content segmentation in audio visual media, and more particularly to a system and method to insert visual subtitles in a video file.

BACKGROUND

Speech is considered as one of the most important signals for human-human interactions, the perception of which is not limited to signals from the auditory domain alone. During a face-to-face interaction, the percept is formed when the auditory and visual systems process the cues presented to them in a synchronous fashion. Studies have indicated that perception of speech is faster when visuals are available, thereby indicating a strong correlation between visual and auditory domains when speech perception is considered. Influence of visual cues on interpretation of various aspects of speech such as prosody, speaking rate, co-articulation, lexical tone, emotions and so on have been explored. In addition, there is a co-relation between head and eyebrow movement and different prosodic conditions. Variations in speaking rate are considered more prominent in the visual domain than in the acoustic domain.

Research has indicated that visual cues are a useful tool to detect emotion. There has been a lack of sufficient visual-speech related work from the perspective of assistive technology for hearing impaired, which demands high accuracy of the visual representation of speech and is one of the embodiments of the disclosed Prior art in this domain that comprises models which produce synthetic visual speech after receiving an input containing speech information. The present disclosure has been elaborated as a technique that increases the accuracy of interpretation and also provides a real time visual impression and implementation of speech features into an animated model.

OBJECTIVES

In accordance with the present disclosure, the primary objective is to provide a plurality of visual subtitles for a video.

Another objective of the disclosure is to segment audio signals of at least one speaker from a plurality of input video frames of a video signal video.

Another objective of the disclosure is to create an acoustic speaker model for speakers identified in the input video signal.

Yet another objective of the disclosure is to perform an audio analysis to identify emotions and also detect lip movement and eyebrow movement.

Still another objective of the disclosure is to recognise phone from the segmented audio signal and map the phone to the most probable viseme representation.

Yet another objective of the disclosure is to create a viseme sequence for the recognized phones.

Another objective of the disclosure is to integrate the viseme sequences and superimpose the viseme sequence on the original video signal for user viewing.

Other objects and advantages of the present invention will be more apparent from the following description when read in conjunction with the accompanying figures, which are not intended to limit the scope of the present disclosure.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a computer implemented method to perform audio segmentation of a video frame of an input video signal to separate speech signal and music signal, generate speaker representation to associate speech segment to a speaker, perform synthesizing of segmented audio signal to create a viseme based language model and create speaker representation sequences to denote lip movements and eyebrow movements and integrate the speaker representation sequences, music segments with the input video signal to create visual subtitles.

In one aspect, an embodiment herein provides a computer implemented system for inserting visual subtitles in videos. The system comprises a memory for storing instructions, a hardware processor coupled to the memory, wherein the hardware processor is configured by instructions to perform audio segmentation of a video frame of an input video signal to separate speech signal and music signal, generate speaker representation to associate speech segment to a speaker, perform synthesizing of segmented audio signal to create a viseme based language model and create speaker representation sequences to denote lip movements and eyebrow movements and then integrate the speaker representation sequences, music segments with the input video signal to create visual subtitles.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DEFINITIONS

Phoneme or phone, as referred to in the disclosure is defined as basic unit of speech.

Viseme is a generic facial image that can be used to describe production of a particular sound. A viseme is the visual equivalent of a phoneme or unit of sound in spoken language. There is a one to many mapping between a phone and a viseme. Often, many phoneme will map to a single viseme. For example, phones corresponding to k, g, η will be similar in a viseme.

Acoustic model represents a relationship between the audio signal and phones that make up the speech.

Language model refers to the probability distribution of sequences of words or phonemes Language model computes the likelihood of words or phrases or phonemes that appear most frequently within the context of another word, phrase or phoneme.

DETAILED DESCRIPTION

Some embodiments of this disclosure, illustrating all its features, are now discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described. In the following description for the purpose of explanation and understanding reference has been made to numerous embodiments for which the intent is not to limit the scope of the disclosure.

One or more components of the concept are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the concept, which may be embodied in various forms.

Method steps of the application may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present application describes a method and a system for inserting visual subtitles in videos. The disclosure discusses creation of a speaker profile with animated lip movement and eyebrow movement that indicate the words spoken and the emotions expressed in the video. In addition, the audio comprising speaker segments and music segments are also differentiated. Some of the envisaged implementations of the method and system so described are to aid the hearing impaired in viewing videos and interpret the video via lip movement and eyebrow movement. Yet another implementation is in creation of avatar-based animations to web based communication systems that can be employed in call centres and in elderly care.

Figure 1:
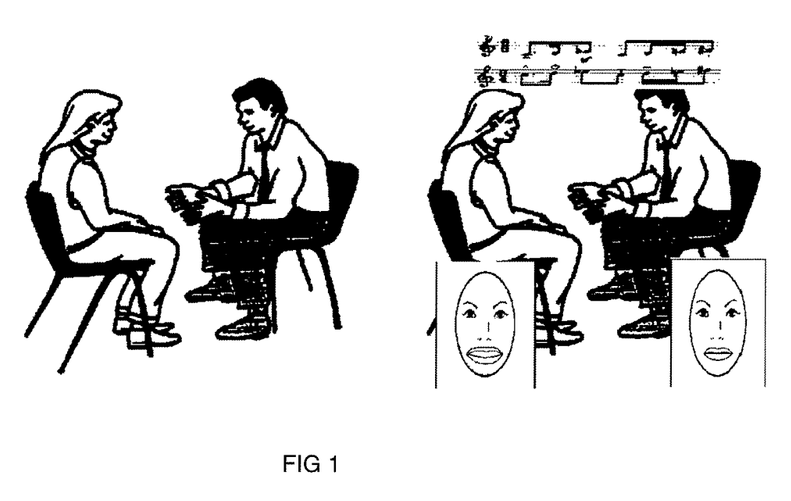
FIG. 1 illustrates an embodiment of insertion of visual subtitles in a video, according to the embodiments as disclosed herein.

FIG. 1 illustrates an implementation of the said disclosure for a video. The Figure depicts a left panel representing the original video comprising multiple speakers. The right panel of the figure represents a speaker model superimposed on the original video, wherein the right panel comprises a portion of the subtitle to indicate any music being played; animated representation of speakers indicating eyebrow and lip movement that are in synchrony with the audio being rendered in the original video. FIG. 1 represents two animated speaker representations that refer to two speakers being displayed in the original video. The speaker representations depict distinct lip movements and eyebrow movements that indicate the words spoken and emotion and last for the duration of the actual audio. This application represented in FIG. 1 aids hearing impaired persons to interpret content of a video by way of analysing lip movements and emotion on the speaker representation.

Figure 2:
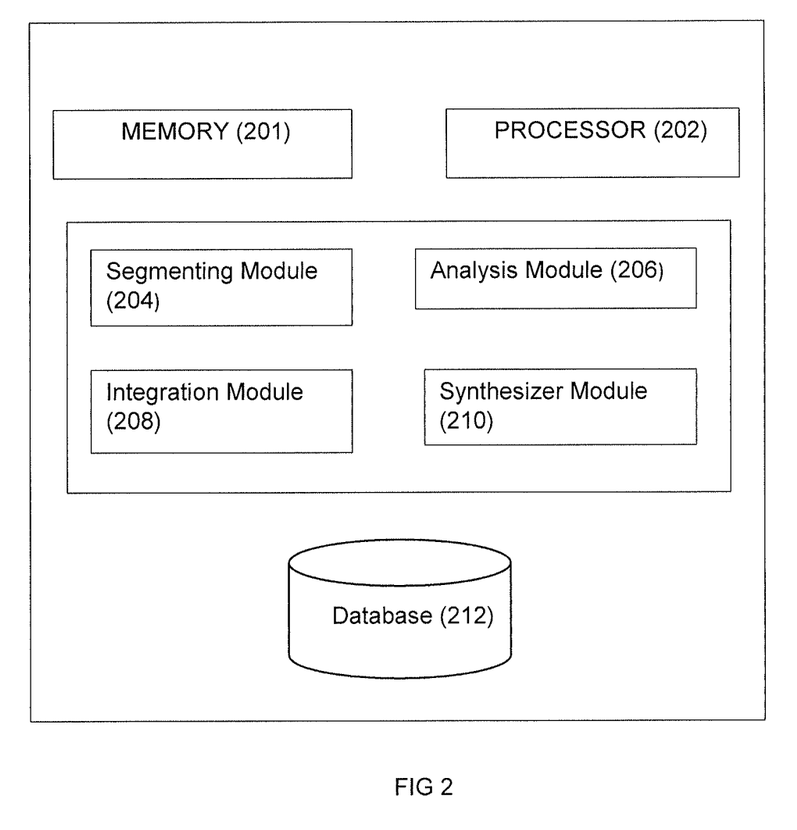
FIG. 2 illustrates a detailed block diagram of the components of the system for inserting visual subtitles in a video, according to the embodiments as disclosed herein.
Figure 3:
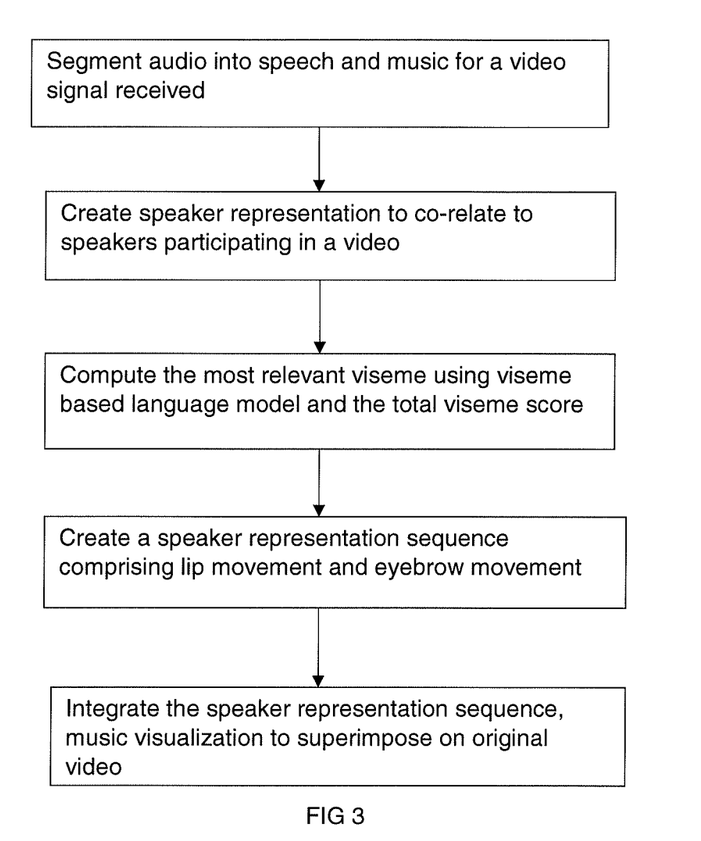
FIG. 3 illustrates a flow diagram depicting the process steps to insert visual subtitles in a video.

The system and method has been explained in subsequent paragraphs with reference to FIG. 2 and FIG. 3. According to an embodiment of the present invention, FIG. 2 represents a system (200) to insert visual subtitles in a video. The system (200) comprises a plurality of modules—a segmenting module (204) to receive a video signal comprising a plurality of frames and further the segmenting module (204) separates speech from music which is received from an input video signal.

In an embodiment, the segmenting module (204) further generates acoustic models for a speaker identified in the input video signal, and also extracts a speaker face for each speaker visible in the video. The analysis module (206) identifies the language of the input speech segments and recognizes the phonemes in the said segment. Further it maps the recognized phonemes to visemes and recognizes the emotions in the speech segments. Further, the analysis module (206) generates music notation from the input music signal. The synthesizer module (208) generates a speaker representation by removing the eyebrow and lip region from the extracted speaker face and by recreating eyebrow movements and lip movements as per the input viseme, viseme duration and emotion. Further, the synthesizer module (208) employs an interpolation based transition for smooth lip and eyebrow movement. The output of the synthesizer module is a speaker representation sequence, which comprises the speaker face with synthesized lips and eyebrows. The integration module (210) integrates the input video signal with the speaker representation sequence and music notation, such that the speaker representation sequence or music notation is super imposed on the received video signal in time synchrony.

The segmenting module (204) receives an input video signal, wherein the input video signal comprises a plurality of frames. The segmenting module (204) extracts audio from the video signal and segments the audio signal into speech and music signals. Further, the speech signal is subjected to speaker segmentation and each segment is tagged to a speaker. In an embodiment, if the video comprises a panel discussion among 3 speakers, the segmenting module (204) separates speech content for each of the three speakers. Further, the input video signal is scanned to observe any type of lip movement activity for a speaker. The immediate audio segment that is in synchrony with the lip movement can then be associated with a said speaker for whom lip movement has been detected. This can be illustrated with an example—for a panel discussion comprising 3 speakers including a host—when the host introduces speaker 1, there is lip movement detected for the host and the associated speech segment is an output.

Similarly, speech segments for all speakers are captured at different time intervals for the duration of the programme. Thus, one of the output of the segmenting module (204) is a plurality of separated speech segments tagged to a plurality of speakers for the input signal. Although most speech segments are tagged to speakers, not all segments can be tagged due lack of video cues such as lip movement in the video.

In the next step, the segmenting module (204) creates a unique acoustic model for each speaker using the speech segments tagged to a speaker. The speech segments that are not tagged to any speaker in the previous step, can belong to either one of the speakers visible in the video or an unseen speaker. For instance, in a video on wildlife, there is only a narrator who is not seen anywhere in the video. A match score is computed between the untagged speech segments and the unique speaker models using known techniques. If the match score falls below a pre-determined threshold, then the untagged speech is assigned to an unseen speaker, else it is assigned to the speaker whose model produces the highest match score. In an embodiment, a Gaussian Mixture Model (GMM) is used for speaker model and log likelihood score is used for match score.

The segmenting module (204) extracts the speaker faces from the input video and tags them to the corresponding speakers using existing techniques, such as a face chopping method.

Further, the analysis module (206) perform an analysis of the segments through certain conventional techniques These comprise identifying language, performing phone recognition and computing the duration of a recognized phone. In addition, emotion recognition for the segmented speech is also performed using techniques that are known in the art. Further, the analysis module (206) generates music notation from the input music signal. These are further inputs to the Synthesizer module (208) for creation of a speaker representation sequence.

In an embodiment, the analysis module (206) performs phone recognition to identify the sequence of phones in the segmented audio signal and the duration of the phone. The accuracy of the phone recognition is further improved by using a language specific acoustic model and a language model. A likelihood score is computed for 'N' best phonemes recognized in the segmented audio signal using techniques known in the art. In an embodiment, the analysis module (204), first computes the 'N' best phones for a video frame from an input video signal, wherein the probability of occurrence of a recognized phone $P_n$ is denoted as $P(P^n)$, where n can take any value between 1 and N. For instance, the analysis module (204) can be configured to determine the 3 best phones, wherein the value of N is defined to be 3.

One of the outputs of the analysis module (206) is a recognized phoneme and duration of the phoneme recorded in milliseconds.

As a next operation, the analysis module (206) maps the recognized phones to corresponding visemes. Phone to viseme mapping can be a many-to-one mapping. Using the method of 'N best results' from phoneme recognition, each phoneme is mapped to a single viseme and multiple phonemes can also be mapped to a single viseme. For instance, multiple phones /p/, /b/, /m/ can be mapped to a single viseme. Mapping multiple phonemes to a single viseme increases the probability of the audio frame corresponding to that particular viseme. In an embodiment, the analysis module (206) maps each recognized phone to a corresponding viseme $V_F$ such that $P_n \leftrightarrow V_F$.

In an embodiment, the value of N is defined as 3 in the audio analysis module (206), and the most frequent phones recognized for the video frame are /k/, /g/, and /t/. Next, the acoustic score of /k/, /g/, and /t/ is designated $AC_k$ $AC_g$ and $AC_t$ using techniques known in the art.

For instance, phones /k/ and /g/ map to viseme X and phone /t/ maps to viseme Y. Next, for better accuracy, the analysis module (206) selects which viseme—viseme X or viseme Y is the best choice for that frame.

As a next operation, the analysis module (206) computes a viseme based language model (VLM) score for viseme X and viseme Y. In an embodiment, let the viseme based language model score be designated as $LM_X$ and $LM_Y$. The VLM score for each viseme is used from a pre-determined viseme-based language model for that language. This score is computed and stored in a table as a reference to compute a total viseme score for a viseme in a video frame. Total score for each viseme is computed as the sum of the product of acoustic score and the VLM score when more than one of the n-best phonemes maps to the same viseme such as in /k/ and /g/ or as product of acoustic score and VLM score if one phone of the n-best recognized phones maps to a viseme can be mapped one-to-one.

In an embodiment the total score for viseme X is computed to be: $(AC_k + AC_g) \times LM_X$ Similarly, total score for viseme Y is computed to be: $AC_t \times LM_Y$.

In the next step the analysis module (206) selects a viseme that has the highest total score for a frame. In an embodiment, if Viseme X has a higher score than Viseme Y, Viseme X is determined to be the most suitable viseme for a video frame.

The viseme thus selected, viseme duration and the emotion for that duration are inputs to the synthesizer module (208), wherein the synthesizer module (208) creates a speaker representation sequence. In an embodiment, the synthesizer module (208) removes the lip and eyebrow region from the speaker faces using conventional techniques. Further, the synthesizer module (208) reconstructs the lip movements based on the input viseme, viseme duration and emotion (For example, upward curl for happy and downward curl for sad). In addition, the synthesizer module (208) also reconstructs the eyebrows based on the recognized emotion and duration. For example, in the expression of anger, the eyebrows are typically pulled downwards and inwards, perhaps in combination with squinting eyes and a tightly closed mouth.

Further, in yet another embodiment, the synthesizer module 208 also employs an interpolation based transition for smooth lip and eyebrow movement. The output of the synthesizer module is the speaker representation sequence, which comprises the face of the speaker with synthesized lips and eyebrows.

The synthesizer module (208) creates lip movements and eyebrow movement transitions using facial animation points (FAP). In an embodiment, let each viseme be represented by N MPEG-4 facial animation points (FAP). Co-ordinates of viseme 1 can be represented as $V_1=(x_i^1, y_i^1)$. Co-ordinates of viseme 2 can be represented by $V_2=(x_i^2, y_i^2)$, where i can take a value between 1 and N.

For a smooth transition between $V_1$ and $V_2$, intermediate viseme states (L) are created through smooth linear interpolation.

$$V_{1 \to 2}^j = (1-c_j) \Box V_1 + c_j \Box V_2$$

where $$c_j = \frac{j}{L}$$

where j can take on values between 1 and L.

Intermediate viseme states, generate closer FAP, to make the transition between visemes smoother and more natural.

Further, in an embodiment, the synthesizer module (206) generates corresponding eyebrow movements. Emotions recognized from the segmented speech content are depicted by different positions of the eyebrow along a line that connects the eyebrows. The technique used for FAP transition for eyebrow movement is the same as that used for generation of lip movement.

The integration module (210) receives the speaker representation sequences generated for an input video frame, which is then super imposed and synchronized with the original video signal. Input to the integration module (210) comprises speaker representation sequence generated by the synthesizer module (208) and music representation from the analysis module (206). The integration module (210) integrates the above inputs onto the original video as to seamlessly integrate the original video signal Thus, the visual subtitle comprises an animated speaker representation sequence for each speaker identified in a video frame, wherein the speaker representation depicts a speaker speaking the segmented audio signal for a time duration 't'. Wherein the speaker representation sequence further depicts emotion recognized in the segmented audio signal.

The method to insert visual subtitles in a video is now explained with respect to FIG. 3. At step 302, an input video signal is segmented to separate audio speech signals and music signal. Further, at step 304, audio segmentation is further enhanced to comprise association of the segmented audio with an acoustic model for a speaker. At step 304, audio segments corresponding to the lip movement of a speaker is identified and a speaker representation is created. Speaker representation comprises extracting a speaker face, of a speaker visible in the video. Further at step 304, speaker segmentation is performed. In an embodiment, if the video comprises a panel discussion among 3 speakers, speech content associated with each of the three speakers is separated. The immediate audio segment that is in synchrony with the lip movement can then be associated with a said speaker for whom lip movement has been detected. Similarly, speech segments for all speakers are captured at different time intervals for the duration of the programme.

Although most speech segments are tagged to speakers, not all segments can be tagged due lack of video cues such as lip movement in the video.

Further, in step 304, an acoustic model is created for each speaker, using the speech segments associated for a speaker. The speech segments that are not tagged to any speaker, can belong to either one of the speakers visible in the video or to an unseen speaker. For instance, in a video on wildlife, there is only a narrator who is not seen anywhere in the video. A match score is computed between the untagged speech segments and the unique speaker models. If the match score falls below a pre-determined threshold, then the untagged speech is assigned to an unseen speaker, else it is assigned to the speaker whose model produces the highest match score. Output of step 304 is a speaker representation and an acoustic model associated with a speaker in the input video frame.

In step 306, language recognition, emotion recognition and phone recognition is performed for the segmented audio signal. Phone recognition is performed to determine the sequence of phonemes and duration of each phoneme in the speech segment. The accuracy of the phone recognition is further improved by using a language specific acoustic model and a language model. A likelihood score is computed for 'N' best phonemes recognized in the segmented audio signal using techniques known in the art.

In step 306, recognized phonemes are mapped to corresponding visemes. Phoneme to viseme mapping can be a many to one mapping. Multiple phonemes /p/, /b/, /m/ can be mapped to a single viseme. One of the outputs of step 306 is a recognized viseme and duration of the viseme recorded in milliseconds. Using the method of 'N best results' from phone recognition, each phoneme is mapped to a single viseme or to multiple visemes.

In an embodiment, the analysis module, first computes the 'N' best phones for a video frame from an input video signal, wherein the probability of occurrence of a recognized phone $P_n$ is denoted as $P(P_n)$, where n can take any value between 1 and N. In an embodiment, N is set to a value 3, and the most frequent phones recognized for a video frame are /k/, /g/, and /t/.

Further, each recognized phoneme is mapped to a corresponding viseme $V_F$ such that $P_n$–$V_F$. Let the viseme-based language model probability of the viseme $V_F$ be $LV_F$. The viseme recognition score for $V_F$ is computed as $P(V_F)=P(P_n) \times LV_F$. Thus the final probability for a viseme $V_x$ where $V_x \in V_F$ can be written as $P(V_x)=\Sigma_i P(V_F) \forall i$ where $P_n \leftrightarrow V_x$.

Using the method of 'N best results' from phoneme recognition, each phoneme is mapped to a single viseme and multiple phonemes can also be mapped to a single viseme. Mapping multiple phonemes to a single viseme increases the probability of the audio frame corresponding to that particular viseme.

In an embodiment, N is set to a value 3, and the most frequent phones recognized for a video frame are /k/, /g/, and /t/. Next, the acoustic score of /k/, /g/, and /t/ is designated $AC_k$ $AC_g$ and $AC_t$.

For instance, phones /k/ and /g/ map to viseme X and phone /t/ maps to viseme Y. Next, for better accuracy, the analysis module has to select which viseme—viseme X or viseme Y is the best choice for the frame.

At step 306, the viseme based language model score is computed for viseme X and viseme Y, which are designated to be $LM_X$ and $LM_Y$. Total score for each viseme is computed as the sum of the product of phoneme likelihood score and the VLM score when more than one of the n-best phonemes maps to the same viseme such as in /k/ and /g/ or as product of acoustic score and VLM score if one phone of the n-best recognized phones maps to a viseme can be mapped one-to-one.

In an embodiment, at step 306, the total score for viseme X is computed to be: $(AC_k+AC_g) \times LM_X$ Similarly, total score for viseme Y is computed to be: $(AC_t \times LM_Y)$.

Further, at step 306, the viseme that has the highest total score for a frame is selected. In an embodiment, if Viseme X has a higher score than Viseme Y, Viseme X is determined to be the most suitable viseme for a video frame.

At step 308, after identifying the most suitable viseme for a video frame, a speaker representation sequence is created. A speaker representation sequence comprises eyebrow movement, lip movement that move in smooth transition with the duration of the viseme. In step 308, the lips and eyebrows are removed from the speaker face and these are replaced with generated eyebrow and lip movements. Further in step 308, interpolation based transition for smooth lip and eyebrow movement is used.

Let each viseme be represented by N MPEG-4 facial animation points (FAP). Co-ordinates of viseme 1 can be represented as $V_1=(x_i^1, y_j^1)$. Co-ordinates of viseme 2 can be represented by $V_2=(x_i^2, y_i^2)$, where i can take a value between 1 and N.

For a smooth transition between $V_1$ and $V_2$, intermediate viseme states (L) are created through smooth linear interpolation.

$$V_{1 \to 2}^j = (1-c_j) \Box V_1 + c_j \Box V_2$$

where $$c_j = \frac{j}{L}$$

where j can farce on values between 1 and L.

Intermediate viseme states, generate closer FAP, to make the transition between visemes smoother and more natural.

Further, in step 308, the lip and eyebrow shapes are reconstructed based on the input viseme, viseme duration and emotion. For example, upward curl for happy and downward curl for sad. Eyebrow shapes are reconstructed for an expression of anger, where the eyebrows are typically pulled downwards and inwards, perhaps in combination with squinting eyes and a tightly closed mouth.

The output of the synthesizer module is the speaker representation sequence, which comprises face of the speaker with synthesized lips and eyebrows.

At step 310, the speaker representation sequence generated for an input video frame is super imposed and synchronized with the original video signal. The end result of integration is the viseme sequence super imposed on the original video and in synchrony with the original video to represent visual subtitles for a video.

The system and method described in this disclosure enable creation of robust audio segmentation by associating an audio segment with a speaker model. Further, phone recognition is further improved by using a viseme based language model. The system and method described herein find application in avatar based communication, in creation of animated videos and one of the embodiments of this disclosure is application of visual subtitles to enable hearing impaired to interpret and understand video content.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented system for creation of visually subtitled videos, wherein said system comprises:
    a memory storing instructions and coupled to the processor, wherein the processor is configured to execute the instructions to perform operations to:
        segment an audio signal with at least one speaker in a video frame from an input video signal and a music segment from the input video signal;
        map a plurality of recognized phones from the segmented audio signal to at least one viseme using a language model;
        determine a likelihood score of the recognized phones;
        determine a viseme based language model score (VLM) for the at least one mapped viseme;
        compute a total viseme score for the at least one mapped viseme by determining a sum of the likelihood score and the VLM score when more than one phone maps to the same viseme or determining a product of the likelihood score and VLM score when one phone maps to a single viseme;
        determine a most relevant viseme from the segmented audio signal by comparing the total viseme score and selecting a viseme with the highest total score;
        generate a speaker representation sequence of the segmented audio signal; and
        integrate the segmented audio signal and viseme sequence to generate visual subtitles.

2. The system as claimed in claim 1, wherein the processor further executes the instructions to create a speaker representation by separating speech segments for at least one speaker visible in the video frame and separating music segments from the video frame.

3. The system as claimed in claim 2, wherein the processor further executes the instructions to extract a speaker face of the at least one speaker visible in the video frame and associating the speaker face with the speech segments.

4. The system as claimed in claim 3, wherein the processor further executes the instructions to create a speaker representation for at least one speaker not visible in the video frame by creating a generic speaker face, wherein a gender of the at least one speaker not visible in the video frame is identified from the speech segments.

5. The system as claimed in claim 2, wherein the processor further executes the instructions to:
   remove a lip region and a mouth region of the speaker representation; and
   reconstruct a lip movement and an eyebrow movement sequence using a series of facial animation points executed through an interpolation simulation corresponding to the most relevant viseme for a computed time duration of the most relevant viseme.

6. The system as claimed in claim 1, wherein the processor further executes the instructions to integrate the music segment and a speaker representation sequence in time synchrony with the input video signal.

7. A computer implemented method for creation of visually subtitled videos, wherein the method comprises:
   segmenting at least one audio signal from an input video frame of a video signal;
   mapping a plurality of recognized phones from the segmented audio signal to at least one viseme using a language model;
   determining a likelihood score of the recognized phones;
   determining a viseme based language model (VLM) score for the at least one mapped viseme;
   computing a total viseme score for the at least one mapped viseme by determining a sum of the likelihood score and the VLM score when more than one phone maps to the same viseme or determining a product of the likelihood score and VLM score when one phone maps to a single viseme;
   analysing the segmented audio signal for the input video frame to select the most relevant viseme by comparing the total viseme score and selecting a viseme with the highest total score;
   generating a speaker representation sequence subsequent to audio segmentation; and
   integrating the video signal with the speaker representation sequence to generate visual subtitles.

8. The method as claimed in claim 7, wherein the segmenting of the at least one audio signal from an input video frame further comprises:
   separating speech segments for at least one speaker visible in the video frame and separating music segments from the video frame; and
   associating at least one acoustic model to a speaker representation.

9. The method as claimed in claim 8, further comprising extracting a speaker face of the at least one speaker visible in the video frame and associating the speaker face with the speech segments.

10. The method as claimed in claim 8, further comprising creating a generic speaker face for at least one speaker not visible in the video frame, wherein a gender of the at least one speaker not visible in the video frame is identified from the speech segments.

11. The method as claimed in claim 7, wherein generating the speaker representation sequence further comprises removing a lip region and a mouth region of at least one speaker representation of the speaker representation sequence and reconstructing a lip movement and an eyebrow movement sequence.

12. The method as claimed in claim 11, wherein generating the speaker representation sequence further comprises using a series of facial animation points to form a lip shape or an eyebrow shape, executed through an interpolation simulation corresponding to the most relevant viseme for a computed time duration of the most relevant viseme.

13. The method as claimed in 12, wherein the eyebrow movement and the lip movement correspond to emotion detected in the speech segments of the segmented audio.

14. The method as claimed in claim 7, wherein the integrating the video signal further comprises integrating a viseme sequence and a notational representation of a music segment in time synchrony with the video signal.

15. One or more non-transitory machine readable information storage mediums comprising one or more instructions which when executed by one or more hardware processors causes:
   segmenting at least one audio signal from an input video frame of a video signal;
   mapping a plurality of recognized phones from the segmented audio signal to at least one viseme using a language model;
   determining a likelihood score of the recognized phones;
   determining a viseme based language model score (VLM) for the at least one mapped viseme;
   computing a total viseme score for the at least one mapped viseme by determining a sum of the likelihood score and the VLM score when more than one phone maps to the same viseme or determining a product of the likelihood score and VLM score when one phone maps to a single viseme;
   analysing the segmented audio signal for the input video frame to select the most relevant viseme by comparing the total viseme score and selecting a viseme with the highest total score;
   generating a speaker representation sequence subsequent to audio segmentation; and
   integrating the video signal with the speaker representation sequence to generate visual subtitles.

* * * * *